(12) United States Patent
Lu

(10) Patent No.: US 10,237,223 B2
(45) Date of Patent: Mar. 19, 2019

(54) DEFERRING MESSAGES USING CONTROL CODES IN MESSAGES

(71) Applicant: Dropbox, Inc., San Francisco, CA (US)

(72) Inventor: Anthony Lu, Foster City, CA (US)

(73) Assignee: Dropbox, Inc., San Francisco, CA (US)

( * ) Notice: Subject to any disclaimer, the term of this patent is extended or adjusted under 35 U.S.C. 154(b) by 364 days.

(21) Appl. No.: 14/161,626

(22) Filed: Jan. 22, 2014

(65) Prior Publication Data
US 2015/0207769 A1 Jul. 23, 2015

(51) Int. Cl.
*H04L 12/58* (2006.01)
*G06F 15/16* (2006.01)

(52) U.S. Cl.
CPC .............. *H04L 51/18* (2013.01); *G06F 15/16* (2013.01); *H04L 51/00* (2013.01)

(58) Field of Classification Search
None
See application file for complete search history.

(56) References Cited

U.S. PATENT DOCUMENTS

| | | | | |
|---|---|---|---|---|
| 4,736,366 | A * | 4/1988 | Rickard | G06F 13/374 370/439 |
| 6,259,892 | B1 * | 7/2001 | Helferich | H04W 84/025 340/7.2 |
| 6,721,784 | B1 * | 4/2004 | Leonard | H04L 51/18 709/204 |
| 7,213,210 | B2 * | 5/2007 | Reysa | G06Q 10/107 715/752 |
| 7,787,406 | B2 | 8/2010 | Park | |
| 8,255,472 | B2 | 8/2012 | MacBeth | |
| 8,442,188 | B2 | 5/2013 | Nikiforou | |
| 9,063,989 | B2 | 6/2015 | Buchheit | |
| 2002/0059385 | A1 * | 5/2002 | Lin | H04L 12/585 709/206 |
| 2003/0200267 | A1 * | 10/2003 | Garrigues | H04L 12/585 709/206 |
| 2003/0236847 | A1 * | 12/2003 | Benowitz | H04L 12/585 709/206 |
| 2007/0002825 | A1 * | 1/2007 | O'Brien | H04L 12/581 370/351 |

(Continued)

OTHER PUBLICATIONS

Hyatt, Michael, "How to Email Your Documents Directly to Evernote," [online], [retrieved on Mar. 9, 2014], retrieved from the Internet: <URL:http://michaelhyatt.com/how-to-email-your-documents-directly-to-evernote.html>, 5 pages.

(Continued)

*Primary Examiner* — Viet D Vu
*Assistant Examiner* — James A Edwards
(74) *Attorney, Agent, or Firm* — DLA Piper LLP US

(57) ABSTRACT

A user operating a messaging client can use control codes to defer messages for later action. For example, a user can defer a message by forwarding the message to herself and including in a field of the message a control code indicating that the message should be deferred until a particular condition is met. A message management service can receive the forwarded message, detect the control code, and defer the forwarded message, the original message, or both, e.g., by temporarily moving the message(s) to a deferred-message store until the condition is met.

20 Claims, 7 Drawing Sheets

(56) References Cited

U.S. PATENT DOCUMENTS

| | | | |
|---|---|---|---|
| 2007/0022165 A1* | 1/2007 | Daniels | G06Q 10/10 |
| | | | 709/206 |
| 2009/0234632 A1* | 9/2009 | Hasegawa | G06F 3/018 |
| | | | 704/1 |
| 2009/0254624 A1* | 10/2009 | Baudin | G06Q 10/107 |
| | | | 709/206 |
| 2009/0285129 A1* | 11/2009 | Swanburg | H04L 29/12047 |
| | | | 370/259 |
| 2010/0161961 A1* | 6/2010 | Beigelman | H04L 63/0428 |
| | | | 713/152 |
| 2010/0241714 A1* | 9/2010 | Aono | H04M 1/72552 |
| | | | 709/206 |
| 2010/0299394 A1 | 11/2010 | Jania | |
| 2011/0184866 A1* | 7/2011 | Shakkarwar | G06Q 20/10 |
| | | | 705/44 |
| 2012/0094698 A1* | 4/2012 | Casto | H04W 4/14 |
| | | | 455/456.4 |
| 2012/0246252 A1 | 9/2012 | Denise | |

OTHER PUBLICATIONS

Clover, Juli, "Mailbox Update Adds Better Snooze Controls and Improved Swiping," Apr. 15, 2013, [online], [retrieved on Sep. 6, 2013], retrieved from the Internet: <URL:http://www.macrumors.com/2013/04/15/mailbox-update-adds-better-snooze-controls-and-improved-swiping/>, 4 pages.

* cited by examiner

DEFERRING MESSAGES USING CONTROL CODES IN MESSAGES

BACKGROUND

The present disclosure relates generally to management of messages and in particular to deferring a message using control codes in messages.

In recent years, electronic messaging services have increased in popularity. Email, for example, has become a vital tool for communication. So many messages are sent and received that users can spend many hours per day just keeping up with the flood and dreaming of an empty inbox. Such dreams are complicated by the fact that messages generally arrive based on when the sender decides to send them, not when the recipient wants or needs to receive the information contained therein. Better techniques for managing messages are therefore desirable.

SUMMARY

Certain embodiments of the present invention relate to techniques for deferring a message for later action. In some embodiments, a user operating a messaging client can receive and view a message (e.g., an email message) and can determine that she would like to act on the message at a later time. The user can defer the message by forwarding the message to herself and including in a field of the message (e.g., the recipient address) a control code indicating that the message should be deferred until a particular condition is met (e.g., a temporal condition, such as the next day, the next week, a specific date, etc.). A message management service can receive the forwarded message, detect the control code, and defer the message, e.g., by temporarily moving the message to a deferred-message store. In some embodiments, the messaging service can divert the original message in addition to or instead of the forwarded message. In some embodiments, one user can send a message to another user and include a control code in a field of the message (e.g., the recipient address) to indicate that delivery of the message should be deferred. A message management service can detect the control code and defer the message.

The following detailed description together with the accompanying drawings will provide a better understanding of the nature and advantages of the present invention.

DETAILED DESCRIPTION

Certain embodiments of the present invention relate to techniques for deferring a message for later action. In some embodiments, a user operating a messaging client can receive and view a message (e.g., an email message) and can determine that she would like to act on the message at a later time. The user can defer the message by forwarding the message to herself and including in a field of the message (e.g., the recipient address) a control code indicating that the message should be deferred until a particular condition is met (e.g., a temporal condition, such as the next day, the next week, a specific date, etc.). A message management service can receive the forwarded message, detect the control code, and defer the message, e.g., by temporarily moving the message to a deferred-message store. In some embodiments, the messaging service can divert the original message in addition to or instead of the forwarded message. In some embodiments, one user can send a message to another user and include a control code in a field of the message (e.g., the recipient address) to indicate that delivery of the message should be deferred. A message management service can detect the control code and defer the message.

Figure 1:
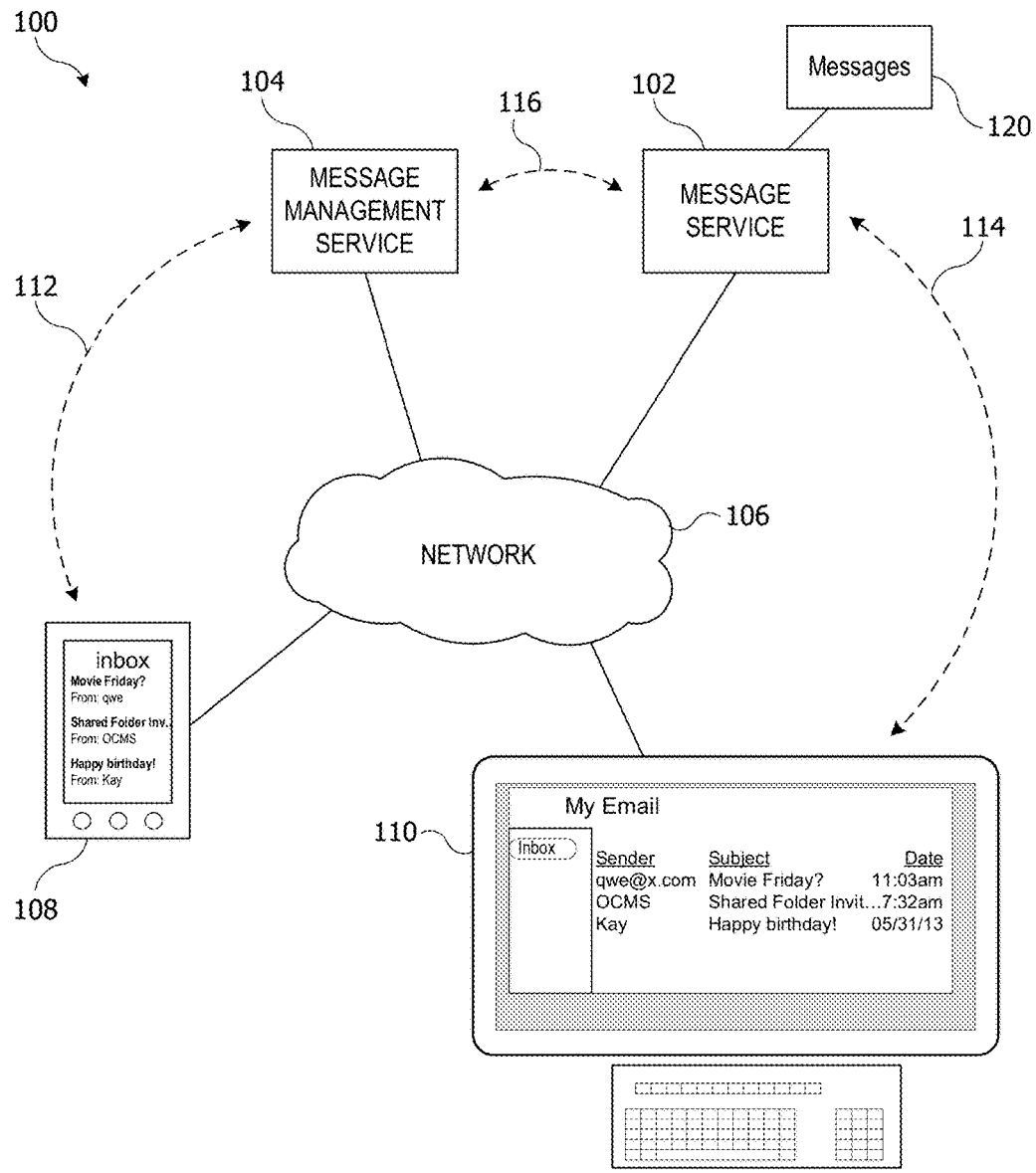
FIG. 1 shows a block diagram of a communication system according to an embodiment of the present invention.

FIG. 1 shows a block diagram of a communication system 100 according to an embodiment of the present invention. Communication system 100 can include a messaging service 102 and a message management service 104 connected to a network 106. Also connected to network 106 can be various clients 108, 110 that can be used to access messaging service 102 and/or message management service 104. In this example, client 108 accesses message management service 104 (as indicated by dashed arrow 112) while client 110 accesses messaging service 102 (as indicated by dashed arrow 114)

Messaging service 102 can be any service that allows users to send, receive, store, and/or access messages, where a "message" can include any electronic communication generated by a sender and directed to one or more recipients, such as email messages, instant messages (e.g., messages sent between users using various "chat" services), SMS/MMS messages (e.g., messages conforming to Short Messaging Service and/or Multimedia Messaging Service protocols supported by various cellular and other wireless data networks), voice messages, photo/image messages, social network messages, and so on. Examples of messaging service 102 can include email services such as Gmail™ (a service of Google Inc.) and Yahoo!® Mail (a service of Yahoo! Inc.). Other examples can include instant messaging or chat services such as Gmail's chat feature or Facebook's chat (a service of Facebook, Inc.), SMS/MMS services provided by cellular data carriers, social network services with a messaging component (e.g., social networks provided by Facebook, Inc., or LinkedIn Corp.). In some embodiments, a user can establish an account with messaging service 102, and messaging service 102 can store and provide access to the user's messages 120. Messaging service 102 can also provide web-based client interfaces, dedicated application programs, application program interfaces (APIs), and/or other tools for facilitating user access to messages 120.

Message management service 104 can be a service that acts as a proxy or intermediary between messaging service 102 and a client 108, as indicated by dashed arrow 116. Message management service 104 can provide enhanced functionality for organizing, storing, accessing, composing, and/or responding to messages 120 stored by messaging service 102. One example of message management service 104 can be the Mailbox service of Dropbox, Inc.

In some embodiments, enhanced functionality provided by message management service 104 can include deferring a message from a recipient's inbox for later action by the recipient. Messages can be deferred in response to instructions from a message recipient or in some instances from a message sender. When a message is deferred, the message can be temporarily removed from the recipient's inbox (where "inbox" generally refers to a collection of received messages for a particular user) and restored to the inbox at a later time, which can be specified by the recipient or the sender. A message that is deferred can thus be temporarily invisible to the recipient. In accordance with some embodiments of the present invention, message management service 104 can defer a message based on a control code included in a received message; examples are described below.

Clients 108 and 110 can be user-operated computing devices that can execute software to interact with message management service 104 and/or messaging service 102. Various types of computing devices can be used, including desktop computers, laptop computers, tablet computers, smart phones, wearable computing devices, personal digital assistants, and so on. By way of example, client 108 can be a smart phone that can execute an application program (also referred to as an app) to communicate with message management service 104 via network 106. The app can be provided by a provider of message management service 104 and can be customized to allow access to enhanced message management functions such as deferring messages in the user's inbox. For example, a user interface of client 108 can be configured to allow the user to indicate that a message should be deferred, e.g., by performing a specific gesture or other input operation. When the user indicates to client 108 that a particular message should be deferred, client 108 can communicate a deferral instruction to message management service 104, and message management service 104 can defer the message.

Client 110 can be a desktop computer that can execute an app to communicate with messaging service 102 without using message management service 104. This app can be, for example, a mail client app built into an operating system of a desktop computer, a web browser that interfaces with a web-based messaging service, a service-specific application provided by the provider of messaging service 102, or another app. Client 110 in examples described herein does not access message management service 104 and might or might not provide user input controls for enhanced functionality such as deferring messages.

A given user can have accounts with both messaging service 102 and message management service 104. The user's account with message management service 104 can be linked to the user's account with messaging service 102, allowing the user to use message management service 104 to manage messages 120 sent and received via messaging service 102. In some embodiments, a user can have multiple accounts with one or more messaging services 102 and can link any or all of these accounts to a single account with message management service 104.

At various times, the user can access messages 120 via client 108 interacting with message management service 104 or via client 110 interacting with messaging service 102. In the latter case, the user interface of client 110 may not provide access to enhanced functionality available through message management service 104, such as message deferral. In accordance with embodiments of the present invention, the user can access such functionality via any client (including client 110) by sending messages to her account at messaging service 102 and including control codes in the messages. As described below, these messages can be received and processed by message management service 104, and the control codes can be used to invoke enhanced functionality such as message deferral, regardless of what client the user is using at a given time.

Figure 2:
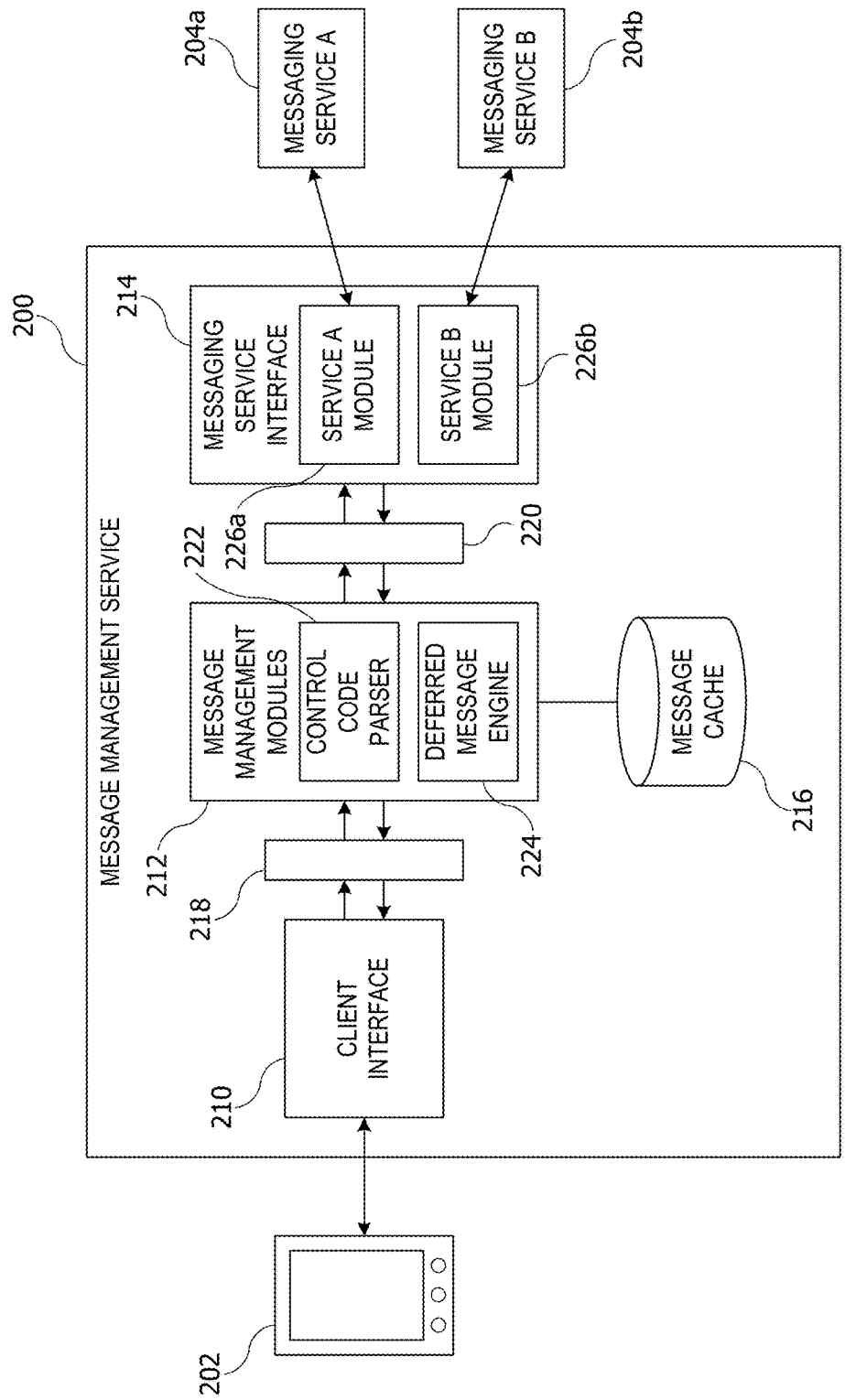
FIG. 2 shows a block diagram of a message management service according to an embodiment of the present invention.

FIG. 2 shows a block diagram of a message management service 200 according to an embodiment of the present invention. Message management service 200 can implement message management service 104 of FIG. 1. For example, message management service 200 can act as an intermediary between a client 202 (e.g., implementing client 108 of FIG. 1) and various messaging services 204a, 204b (e.g., implementing messaging service 102) of FIG. 1. Each service 204a, 204b can be a different messaging service, such as different email services, an email service and a social network service, and so on. While two messaging services 204 are shown, any number of messaging services 204 can be supported by a single message management service 200.

Message management service 200 can include a client interface 210, message management modules 212, a messaging service interface 214, and a message cache 216. A client transfer layer 218 can provide transfer queues for transferring messages and other instructions and information between client interface 202 and message management modules 212, and a service transfer layer 220 can provide transfer queues for transferring messages and other instructions and information between message management modules 212 and messaging service interface 214.

Client interface 210 can communicate with multiple instances of client 202 (e.g., clients associated with different users and/or multiple clients associated with the same user). For instance, client interface 210 can deliver "inbound" messages from messaging services 204a, 204b to client 202, receive "outbound" messages from client 202, and/or receive various message processing instructions from client 202, such as instructions to defer a message.

Message management modules 212 can include functional blocks or modules configured to perform various operations on messages received by message management service 200, including outbound messages received from client 202 as well as inbound messages received from messaging services 204a, 204b. For example, message management modules 212 can include control code parser 222 and deferred message engine 224. Control code parser 222 can detect the presence of control codes in a received message and determine appropriate actions to take based on the control codes, such as deferring a message. Examples of processes that can be implemented in control code parser 222 are described below.

Deferred message engine 224 can manage deferred messages. As described above, deferred messages can be temporarily removed from the user's inbox and restored to the inbox when the deferral period ends. Deferred message engine 224 can manage this process. For example, deferred message engine 224 can receive an instruction to defer a particular message, e.g., from control code parser 222 or from other message management modules 212. The instruction can include the message to be deferred or an identifier thereof, as well as information defining a condition under which the message should be restored to the user's inbox. Deferred message engine 224 can remove the message from the user's inbox, e.g., by sending an instruction to messaging service interface 214 to instruct messaging service 204 to move the message from the inbox to a special folder used for storing deferred messages. Deferred message engine 224 can store the deferral instructions and periodically process the instructions to determine whether a condition for restoring a particular message has been met. If the condition for a particular message is met, deferred message engine 224 can restore the message to the user's inbox. In some embodiments, deferral can extend to other conditional actions and is not limited to removal from and restoration to an inbox. For example, deferred actions can include alerting the user (or another user), moving a message to a folder, sending a pre-composed response to a message, deleting a message, sharing a message or related content on a social network, and so on.

Messaging service interface 214 can include various service modules 226a, 226b, each of which can be configured to communicate with a different one of messaging services 204a, 204b. For example, different messaging services 204 may support different communication protocols for access by external clients (e.g., IMAP, POP, MAPI/Exchange, custom APIs, and so on), and each service module 226 can be configured to use the appropriate protocol for a particular messaging service 204.

In some embodiments, messaging service interface 214 can present itself to messaging services 204a, 204b as a client accessing functionality of messaging services 204a, 204b, so that the existence of message management service 200 can be transparent to messaging services 204a, 204b. For example, if messaging service 204a supports IMAP, service module 226a can establish a persistent IMAP connection to a user's account with messaging service 204a, allowing messaging service 204a to deliver any incoming messages it receives for the user's account to message management service 200. Persistent connections to other services than IMAP can also be maintained, or messaging service interface 214 can periodically poll messaging services 204 to obtain new messages. The persistent connection can be maintained regardless of whether the user currently has any client 202 connected to client interface 210, and message management service 200 can maintain synchronization with messaging services 204.

Message cache 216 can be a database or other data store that provides storage and retrieval of messages. For example, messages can be stored and retrieved by reference to message identifiers (message IDs) assigned to each message by message management service 200 and/or messaging services 204. Message management service 200 can use message cache 216 to store copies of messages that are likely to be of interest to a client, such as recently received messages or messages found in a user-initiated search. Messaging services 204 can maintain their own message stores independently of any action by message management service 200. In some embodiments, messaging service 204 can maintain a primary store of messages for a user that can include all messages currently associated with that user's account (e.g., including sent messages, received messages, archived messages, etc.), and message cache 216 can store a subset of the user's messages as well as information about additional messages in the primary store. If client 202 requests a message that is not presently stored in message cache 216, message management service 200 can retrieve the message from the appropriate messaging service 204 and deliver it to client 202.

In operation, message management service 200 can obtain inbound messages from messaging services 204 and provide the messages to client 202. Message management service 200 can also receive outbound messages (e.g., messages to be sent) from client 202 and provide the messages to messaging service 204 for delivery to the recipient(s). Message management modules 212 can perform various operations on inbound and/or outbound messages.

For example, in some embodiments, message management modules 212 can operate to defer messages received from client 202 or from messaging service 204. When a message reaches message management modules 212 (in either the inbound or outbound direction), control code parser 222 can analyze the message to detect the presence of a control code indicating an action to be taken, such as deferring a message. If a control code is detected, control code parser 222 can instruct other modules to take the appropriate action; for instance, control code parser 222 can instruct deferred message engine 224 to defer a message. Specific examples of control codes and deferral actions are described below.

It will be appreciated that message management service 200 is illustrative and that variations and modifications are possible. For example, other message management modules and/or operations can be provided. In some embodiments, message management can include windowing (selecting and immediately delivering to a client a fixed number of messages deemed likely to be relevant, such as the 50 or 100 or some other number of most recent messages), backfilling (populating message cache 216 with messages in anticipation of client requests), message format conversion (e.g., converting between a message format used by a messaging service and a format optimized for display on a client), management of message folders or streams, message sorting, management of attachments, synchronization with messaging services 204 (e.g., relaying instructions from client 202 to move or modify messages) and so on.

Figure 3:
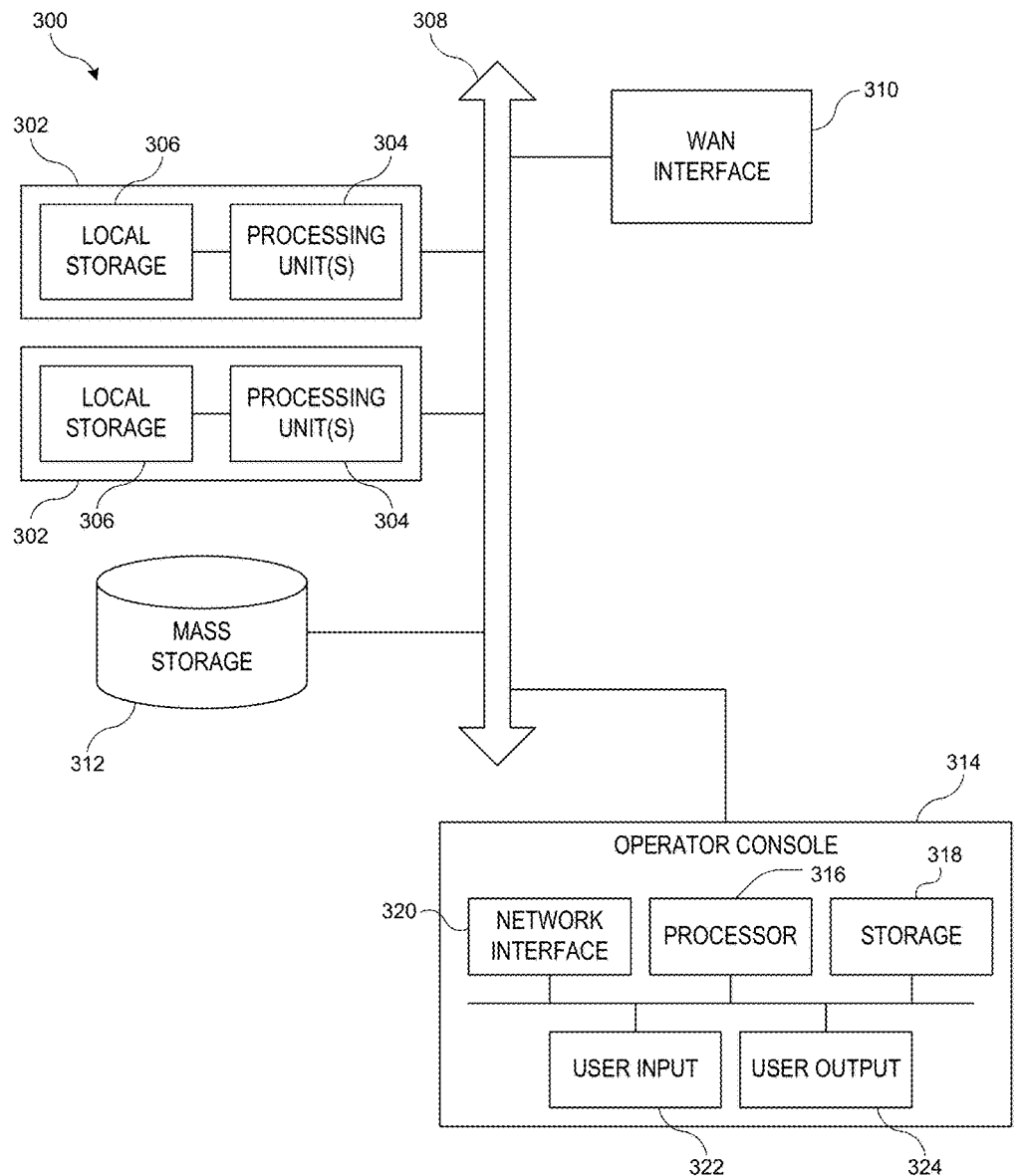
FIG. 3 is a simplified block diagram illustrating a representative server system according to an embodiment of the present invention.

Various operations described herein can be implemented on server systems, which can be computer systems of generally conventional design. FIG. 3 is a simplified block diagram illustrating a representative server system 300. In various embodiments, server system 300 or similar systems can implement message management service 200, messaging services 204, or any other servers described herein or portions thereof.

Server 300 can have a modular design that incorporates a number of modules 302 (e.g., blades in a blade server implementation); while two modules 302 are shown, any number can be provided. Each module 302 can include processing unit(s) 304 and local storage 306.

Processing unit(s) 304 can include a single processor, which can have one or more cores, or multiple processors. In some embodiments, processing unit(s) 304 can include a general-purpose primary processor as well as one or more special-purpose co-processors such as graphics processors, digital signal processors, or the like. In some embodiments, some or all processing units 304 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 304 can execute instructions stored in local storage 306. Any type of processors in any combination can be included in processing unit(s) 304.

Local storage 306 can include volatile storage media (e.g., conventional DRAM, SRAM, SDRAM, or the like) and/or non-volatile storage media (e.g., magnetic or optical disk, flash memory, or the like). Storage media incorporated in local storage 306 can be fixed, removable or upgradeable as desired. Local storage 306 can be physically or logically divided into various subunits such as a system memory, a read-only memory (ROM), and a permanent storage device. The system memory can be a read-and-write memory device or a volatile read-and-write memory, such as dynamic random access memory. The system memory can store some or all of the instructions and data that processing unit(s) 304 need at runtime. The ROM can store static data and instructions that are needed by processing unit(s) 306. The permanent storage device can be a non-volatile read-and-write memory device that can store instructions and data even when module 302 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 306 can store one or more software programs to be executed by processing unit(s) 304, such as an operating system and/or programs implementing various server functions such as functions of message management modules 212, messaging service interface 214, and/or client interface 210 of FIG. 2, or any other server(s) associated with messaging system 100 of FIG. 1. "Software" refers generally to sequences of instructions that, when executed by processing unit(s) 304 cause server system 300 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 304. Software can be implemented as a single program or a collection of separate programs or program modules that interact as desired. From local storage 306 (or non-local storage described below), processing unit(s) 304 can retrieve program instructions to execute and data to process in order to execute various operations described herein.

In some server systems 300, multiple modules 302 can be interconnected via a bus or other interconnect 308, forming a local area network that supports communication between modules 302 and other components of server system 300. Interconnect 308 can be implemented using various technologies including server racks, hubs, routers, etc.

A wide area network (WAN) interface 310 can provide data communication capability between the local area network (interconnect 308) and a larger network, such as the Internet. Conventional or other communications technologies can be used, including wired (e.g., Ethernet, IEEE 802.3 standards) and/or wireless technologies (e.g., Wi-Fi, IEEE 802.11 standards).

In some embodiments, local storage 306 is intended to provide working memory for processing unit(s) 304, providing fast access to programs and/or data to be processed while reducing traffic on interconnect 308. Storage for larger quantities of data can be provided on the local area network by one or more mass storage subsystems 312 that can be connected to interconnect 308. Mass storage subsystem 312 can be based on magnetic, optical, semiconductor, or other data storage media. Direct attached storage, storage area networks, network-attached storage, and the like can be used. Any data stores or other collections of data described herein as being produced or consumed by servers can be stored in mass storage subsystem 312. In some embodiments, additional data storage resources may be accessible via WAN interface 310 (potentially with increased latency).

Server system 300 can operate in response to requests received via WAN interface 310. For example, one of modules 302 can implement a supervisory function and assign discrete tasks to other modules 302 in response to received requests. Conventional work allocation techniques can be used. As requests are processed, results can be returned to the requester via WAN interface 310. Such operation can generally be automated. Further, in some embodiments, WAN interface 310 can connect multiple server systems 300 to each other, providing scalable systems capable of managing high volumes of activity. Conventional or other techniques for managing server systems and server farms (collections of server systems that cooperate) can be used, including dynamic resource allocation and reallocation.

In some embodiments, operator console 314 can be provided to allow a system operator or administrator to interact directly with server system 300, e.g., for purposes of monitoring, testing, troubleshooting, upgrading, or the like. Operator console 314 can include conventional computer components such as a processor 316, storage device 318, network interface 320, user input device 322, and user output device 324. In some embodiments, operator console 314 can be physically remote from the rest of server system 300 and can be connected via WAN interface 310.

Processor 316 and storage device 318 can be similar to processing unit(s) 304 and local storage 306 described above. Suitable devices can be selected based on the demands to be placed on operator console 314; for example, console 314 can be implemented as a "thin" client with limited processing capability. Network interface 320 can provide a connection to interconnect 308. User input device 322 can include any device (or devices) via which a user can provide signals to console 314; console 314 can interpret the signals as indicative of particular user requests or information. In various embodiments, user input device 322 can include any or all of a keyboard, touch pad, touch screen, mouse or other pointing device, scroll wheel, click wheel, dial, button, switch, keypad, microphone, and so on.

User output device 324 can include any device via which console 314 can provide information to a user. For example, user output device 324 can include a display to display images generated by or delivered to console 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 324 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 304 can provide various functionality for server system 300, including any of the functionality described herein as being performed by a server or other functionality associated with an online content management service.

As noted above, a message management service can interact with various user-owned or user-operated devices via a network such as the Internet. The user-operated devices can be computer systems, e.g., with components similar to operator console 314, with network connectivity provided using wired and/or wireless technologies. User devices can be implemented, for example, as consumer devices such as smart phones, other mobile phones, tablet computers, wearable computing devices (e.g., smart watches, eyeglasses), desktop computers, laptop computers, and so on. Such devices can be provisioned with program code to enable various interactions with the message management service such as accessing messages, instructing the service to defer messages, and so on. Some user devices can also interact with a messaging service independently of the message management service, e.g., via a network interface.

It will be appreciated that server system 300 is illustrative and that variations and modifications are possible. Computer systems used in connection with embodiments of the present invention can have other capabilities not specifically described here. Further, while server system 300 is described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 4:
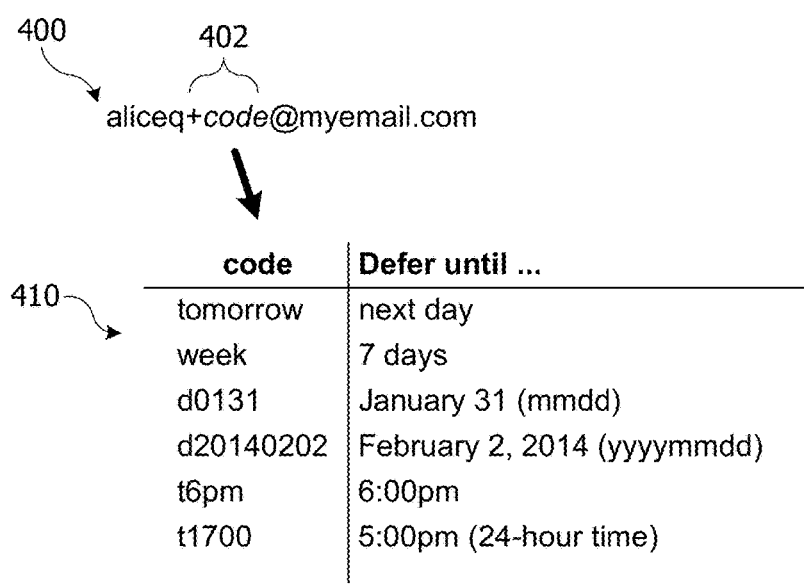
FIG. 4 shows examples of a control code syntax and control codes for deferring messages according to an embodiment of the present invention.

As described above, a user can include a control code in a message to indicate to message management service 200 that the message should be deferred. FIG. 4 shows examples of a control code syntax and control codes for deferring messages according to an embodiment of the present invention. In this example, the messages can be email messages.

Email address 400 is an example of an email address that includes a control code according to an embodiment of the present invention. In this example, a user with username aliceq has an email account with a messaging service (e.g., messaging service 204a of FIG. 2) at the domain myemail.com. Via this account, the user can receive emails addressed to aliceq@myemail.com. It is assumed that the user has linked the account aliceq to message management service 200 such that message management service 200 can receive and process incoming messages addressed to aliceq@myemail.com.

Control code 402, represented syntactically as +code, can be embedded in email address 400 as shown. In some embodiments, a number of different codes can be defined, as shown in table 410, with each code corresponding to a different deferral instruction. For example, code +tomorrow can defer the message to the following day (e.g., for 24 hours or until a particular time on the following day such as 8:00 a.m. or 5:00 p.m.). Code +week can defer the message for seven days (e.g., exactly seven days, or a specific time on the date one week away, such as 8:00 a.m. or 5:00 p.m.). Other codes can be defined to defer a message until a specified date (e.g., +d0131 or +d20140202, where the date can be in expressed either mmdd or yyyymmdd format) or until a specified time within the next 24 hours (e.g., +t6 pm or +t1700, where time can be expressed in either 12-hour or 24-hour format). Other codes can also be defined, such as combined date and time code.

In the embodiment of FIG. 4, control code 402 can be appended to the username portion of email address 400. Control code 402 can be delimited by an initial "+" character and the "@" character that separates the username portion of email address 400 from the domain name portion of email address 400. Use of the "+" character as an initial delimiter is consistent with certain email addressing conventions in which "+" is not used as a character in an email account name or domain name. Many email services are programmed to disregard a "+" character and any portion of a username following this character. It is to be understood that other characters, symbols, or delimiters can be used to distinguish a control code from other portions of an email address.

Further, the control code examples in FIG. 4 relate to time-based deferral, where the message can be removed from the recipient's inbox until a particular time (or date), at which time the message can be restored to the inbox. However, other deferral conditions can also be specified using control codes similar to those in FIG. 4. For example, a message can be deferred for later presentation to a user based on conditions such as the user or the user's client device being in a particular location, the user operating a particular client device, another user responding to a message, and so on. Control codes similar to those in table 410 can be defined for any condition that deferred message engine 224 of FIG. 2 is capable of detecting and processing.

Email address 400 can be included in a message to indicate that the message should be deferred. For example, email address 400 can be provided as a recipient address in the "To" field of an email message. Referring to FIG. 1, if a message addressed to email address 400 is received at messaging service 102, messaging service 102 can ignore control code 402 and route the message to the user account of user aliceq. If message management service 104 is managing messages for aliceq's account at messaging service 102, message management service 104 can receive the routed message from messaging service 102, including address 400 with embedded control code 402. Messaging service 102 can recognize control code 402 (e.g., using control code parser 222 of FIG. 2) and process the message accordingly (e.g., instructing deferred message engine 224 to defer the message).

Figure 5:
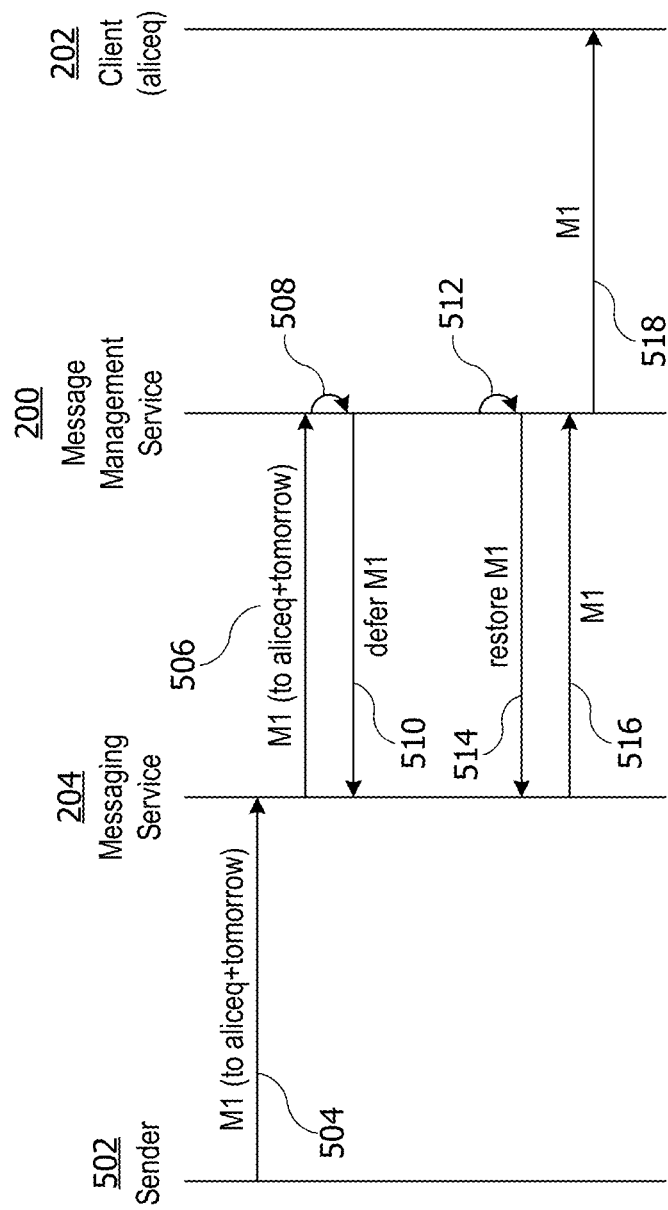
FIG. 5 shows an example of message handling according to an embodiment of the present invention.

FIG. 5 shows an example of message handling according to an embodiment of the present invention. In this example, a sender 502 (who can be the same as the recipient or someone else) can send a message M1 to messaging service 204. Message M1 can include a control code, e.g., by being addressed to aliceq+tomorrow@myemail.com, as shown at event 504. Assuming that aliceq has linked her account at messaging service 204 to message management service 200, message management service 200 can receive message M1 at event 506. Message management service 200 can detect the control code (e.g., +tomorrow) and determine that the message should be deferred at event 508. At event 510, message management service 200 can send instructions related to the deferral of message M1 to messaging service 204. For example, message management service 200 can instruct messaging service 204 to move message M1 from aliceq's inbox to a deferred-message folder.

At a later time (e.g., the next day), message management service 200 can determine (event 512) that the deferral condition has been met and the deferral of message M1 should end. Accordingly, at event 514, message management service 200 can send instructions to messaging service 204 related to restoring message M1. For example, message management service 200 can instruct messaging service 204 to move message M1 from the deferred-message folder to aliceq's inbox. In some embodiments, if message management service 200 does not have a cached copy of message M1, message management service 200 can obtain message M1 from messaging service 204 at event 516. At event 518, message management service 200 can deliver message M1 to aliceq's client 202.

In this example, aliceq's client 202, which accesses aliceq's messages via message management service 200 does not receive message M1 until the deferral period ends. Accordingly, user aliceq might not see message M1 at all until the deferral period ends. It should be noted that user aliceq may also be able to access her account at messaging service 204 using a different client (e.g., client 110 of FIG. 1) that does not interface with message management service 200. In this case, aliceq may briefly see message M1 in her inbox before it is deferred (e.g., between events 504 and 510), or aliceq may be able to view her deferred-message folder and see message M1 while it is deferred. However, to the extent that user aliceq relies on client 202 to access her messages, she would not see deferred message M1 until after event 516.

Sender 502 can be user aliceq or another user. For example, aliceq can send reminder messages to herself for later action and defer delivery of the reminder messages by inserting the appropriate control code into the message. As another example, another user can delay delivery of a message to aliceq by inserting a control code into the message.

Figure 6:
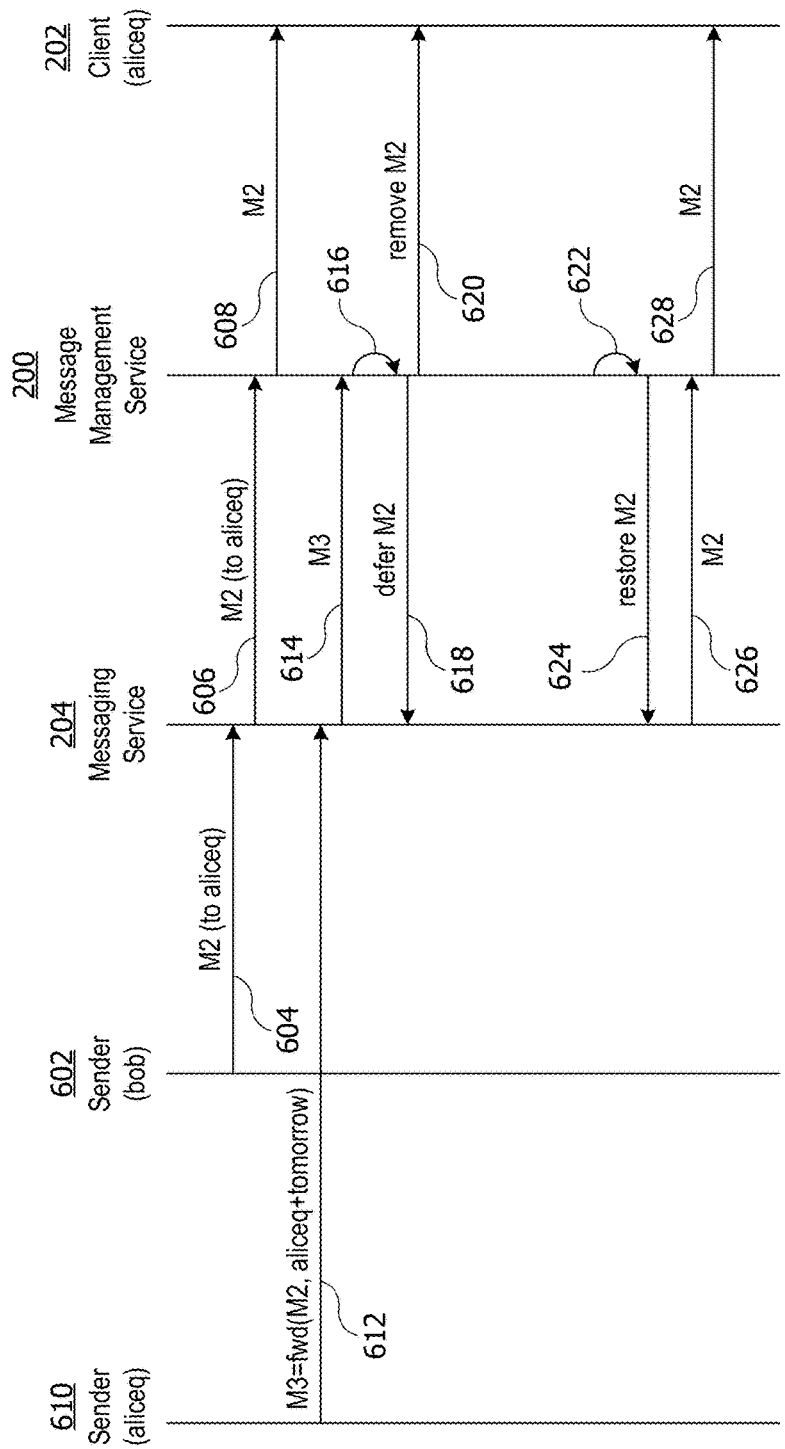
FIG. 6 shows another example of message handling according to an embodiment of the present invention.

In some instances, a recipient user may want to defer a message received from another user. FIG. 6 shows another example of message handling according to an embodiment of the present invention. In this example, the recipient user (aliceq) can instruct message management service 200 to defer a message that has been received from another user.

In this example, a sender 602 (username bob) can send a message M2 to messaging service 204 at event 604. The "to" address in message M2 does not include any control codes and simply identifies the recipient as aliceq. Assuming that user aliceq has linked her account at messaging service 204 to message management service 200, message management service 200 can receive message M2 at event 606. No control codes indicating deferral are present, and accordingly message management service 200 can deliver message M2 to client 202 without deferral at event 608. In this case, message M2 can remain in aliceq's inbox at messaging service 204 until user aliceq acts on it.

In this example, the recipient user (aliceq) can access message M2 using client 202 (which uses message management service 200) or another client 610 (e.g., client 110 of FIG. 1) that accesses messaging service 204 without using message management service 200. In the case where user aliceq is using client 610, if user aliceq determines that she wants to defer message M2, she can forward message M2 to herself as message M3 at event 612. User aliceq can include a control code in the "to" address for forwarded message M3 (e.g., aliceq+tomorrow@myemail.com) to provide the deferral instruction.

Assuming that aliceq has linked her account at messaging service 204 to message management service 200, message management service 200 can receive message M3 at event 614. At event 616, message management service 200 can detect the control code (e.g., +tomorrow) and determine that M3 is a forwarded version of message M2 that user aliceq has forwarded to herself and that therefore message M2 (the parent message of forwarded message M3) should be deferred. At event 618, message management service 200 can send instructions related to the deferral of parent message M2 to messaging service 204. For example, message management service 200 can instruct messaging service 204 to move parent message M2 from aliceq's inbox to a deferred-message folder and to delete forwarded message M3. In some embodiments, both messages M2 and M3 can be moved to the deferred-message folder. Message management service 200 can also instruct client 202 to remove message M2 from user aliceq's inbox at event 620.

At a later time (e.g., the next day), message management service 200 can determine (event 622) that the deferral of parent message M2 should end. Accordingly, at event 624, message management service 200 can send instructions to messaging service 204 related to restoring parent message M2 (and optionally forwarded message M3 as well). For example, message management service 200 can instruct messaging service 204 to move parent message M2 from the deferred-message folder to aliceq's inbox. In some embodiments, if message management service 200 does not have a cached copy of parent message M2 (and forwarded message M3 if applicable), message management service 200 can obtain message M2 (and M3 if applicable) from messaging service 204 at event 622. At event 624, message management service 200 can deliver parent message M2 (and forwarded message M3 if applicable) to aliceq's client 202.

In this example, a user can initiate deferral of a message using any client that is capable of receiving messages sent to her account at a messaging service, by forwarding the received message to herself and including in the forwarded message a control code indicating the deferral instruction. This can be convenient, for instance, if the user is accessing her messages using a client that does not communicate with message management service 200 but still wishes to exploit the ability of message management service 200 to defer messages. It should be noted that the user can also initiate deferral by forwarding a message to herself from a client that does communicate with message management service 200 (e.g., client 108 of FIG. 1); however, if the client provides a user-interface control for deferring messages, operating this control may be more efficient for the user than forwarding a message.

Figure 7:
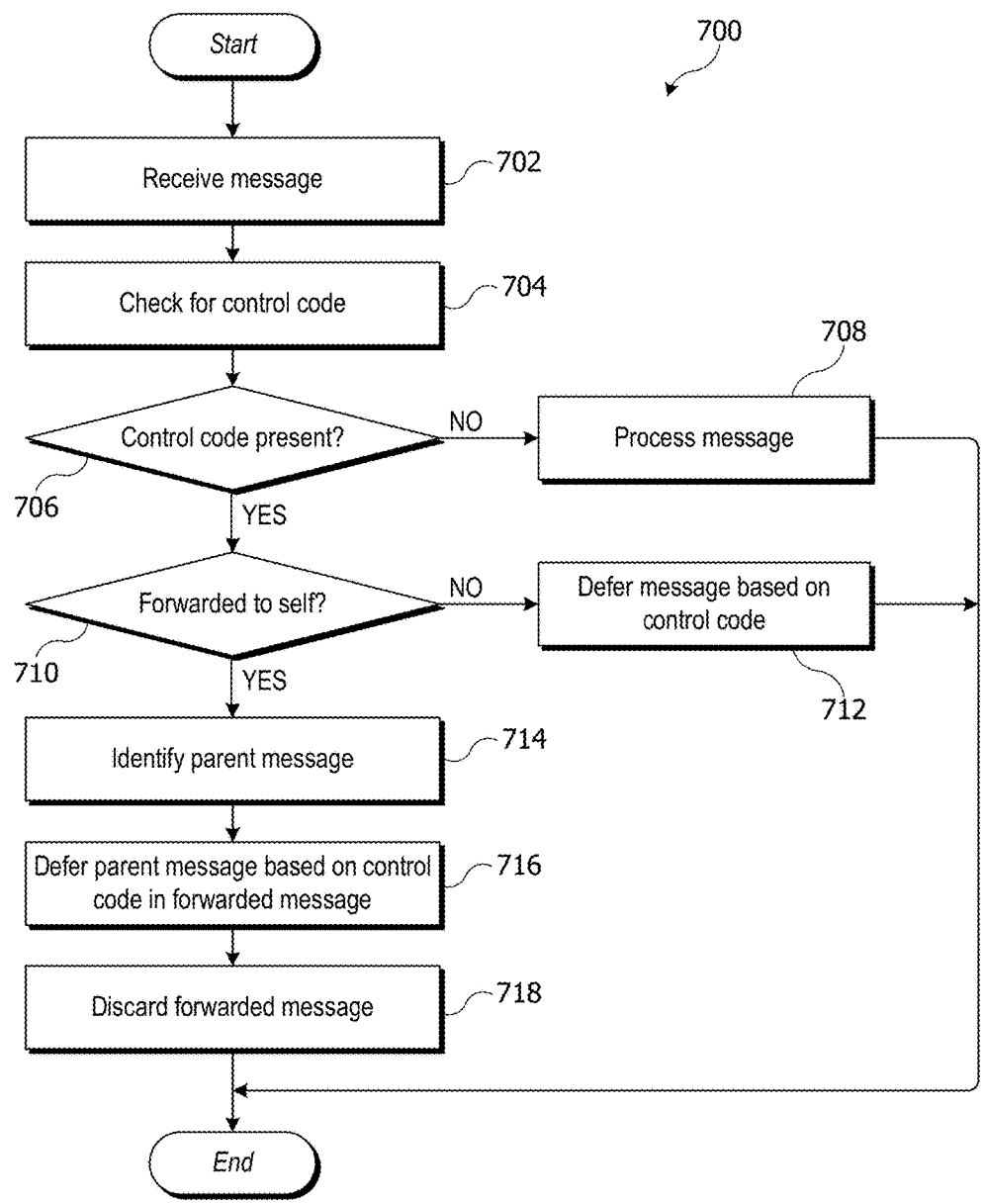
FIG. 7 shows a flow diagram of a process for deferring a message according to an embodiment of the present invention.

As described above, message management service 200 can detect and process control codes to defer messages. FIG. 7 shows a flow diagram of a process 700 for deferring a message according to an embodiment of the present invention. Process 700 can be implemented, e.g., in control code parser 222 of message management service 200 of FIG. 2. Process 700 can facilitate the deferral behavior described above with reference to FIGS. 5 and 6.

Process 700 can begin at block 702 with receipt of a message by message management service 200. At block 704, process 700 can check the received message to determine whether a control code indicating message deferral is present. For example, a control code as shown in FIG. 4 can be detected in the recipient address field of an email message. If, at block 706, no control code is present, then at block 708, other message processing operations can be performed.

Such operations can include, for example, delivering the message to a client associated with the intended recipient.

If, at block 706, a control code indicating message deferral is present, then at block 710, process 700 can determine whether the message is forwarded from the sender to herself. For example, message M1 in FIG. 5 is not a message forwarded from the sender to herself, but message M3 in FIG. 6 is.

Determining whether a message is forwarded from a sender to herself at block 710 can include examining various fields of the message for indicia indicating that the message is forwarded and/or that the sender and the recipient are the same. For instance, in an email message, email addresses in the "To" and "From" fields can be compared to determine whether they refer to the same user account, e.g., by determining whether the addresses, or selected portions thereof, match. In some embodiments, message management service 200 can manage multiple accounts for the same user and can detect a match if the "To" and "From" fields both refer to accounts belonging to the same user, even if the addresses do not match. Other indicia, such as the presence "FW" or "FWD" at the beginning of the subject line, similarity of message body portions, and/or headers referencing related messages, can also be used to identify forwarded messages.

If the message is not forwarded from the sender to herself, then at block 712, the message can be deferred based on the control code. As described above, deferring the message can include instructing messaging service 204 to move the message out of the recipient's inbox. The control code can be used to define a condition under which the message should be restored to the recipient's inbox.

If, at block 710, the message is determined to be a forward from the sender to herself, then at block 714, process 700 can identify the parent message (e.g., message M2 of FIG. 6 if the forwarded message is M3). For example, an email message may contain a "Reference" or "In-Reply-To" header that identifies a parent message. As another example, a parent message can be identified based on comparing message contents.

At block 716, process 700 can defer the parent message based on the control code. As described above, deferring the message can include instructing messaging service 204 to move the message out of the recipient's inbox. The control code can be used to define a condition under which the message should be restored to the recipient's inbox.

At block 718, the forwarded message (e.g., message M3 in the example of FIG. 6) can be discarded. In some embodiments, it is inferred that when the user forwards a parent message (e.g., message M2 in the example of FIG. 6) to herself with a control code, she wants to defer parent message M2, and once parent message M2 has been deferred, the forwarded message M3 is no longer of interest. Thus, the forwarded message can be discarded, e.g., by instructing messaging service 204 to delete it. In other embodiments, forwarded message M3 can be deferred in addition to or instead of deferring parent message M2. In still other embodiments, the treatment of forwarded message M3 can be conditional. For example, if the user adds something to the body of the parent message M2 before forwarding it as forwarded message M3, this may indicate that the user would want to see forwarded message M3 later. In some embodiments, process 700 can include detecting whether the message bodies of the forwarded message and the parent message are different. The forwarded message can be deferred along with the parent message if their message bodies are different, and the forwarded message can be deleted if its message body is not different from the parent.

Once a message has been deferred, deferred message engine 224 of FIG. 2 can handle the message as it would any other deferred message. For example, as described above, deferred message engine 224 can determine when the condition for ending the deferral is met; when the condition is met, deferred message engine 224 can restore the deferred message(s) to the user's inbox.

It will be appreciated that process 700 is illustrative and that variations and modifications are possible. Steps described as sequential may be executed in parallel, order of steps may be varied, and steps may be modified, combined, added or omitted. Process 700 can be performed for every received message. It should be noted that process 700 can allow the user to defer messages by forwarding them to herself and can also allow other users to send deferred messages to a user and to specify a condition under which the user should receive the message. Further, while process 700 is described as being implemented in a message management service that acts as an intermediary between a messaging service and a user-operable client, those skilled in the art with access to the present disclosure will appreciate that process 700 or a similar process can also be implemented in a messaging service, allowing the messaging service itself to support deferral of a message.

In some embodiments, a client that communicates with a message management service can exploit process 700 to provide support for message deferral without requiring the user to manually enter a control code. For example, a client app can provide a user interface via which the user can instruct the client to defer a message by operating a user-interface control element. If the user operates this element, the client can (transparently to the user) construct a forwarded message that includes the user's address and a control code as described above, then send the forwarded message to the user's messaging service. The message will eventually be received and processed using process 700, resulting in deferral.

Embodiments described above provide techniques for deferring a message using control codes embedded in the message, for instance in the recipient's address. The message can be received at a message management service that can detect and process the control code to effect deferral of the message until a condition specified by the control code is met. Thus, the user can defer messages without depending on a particular client interface to invoke the deferral function. In addition, different users can send deferred messages to each other by including control codes that a service used by the recipient to manage messages can recognize.

While the invention has been described with respect to specific embodiments, one skilled in the art will recognize that numerous modifications are possible. For example, certain embodiments described above pertain to email messages and specific email address formats. However, the invention is not limited to email or to a particular message or address format. A control code can be incorporated into various types of messages, including SMS/MMS messages, instant messages, social network messages, and so on. Further, the control code need not be incorporated into a recipient's address or other recipient identifier in the message; a control code can be included in any header field or body field of a structured message format, and control codes can be identified using delimiter characters, tags (e.g., XML tags), or other indicia. Thus, control codes can be used to manage any type of message that can be sent, provided that a message management service is capable of distinguishing the control codes from other message elements.

The particular control code formats and functionality described herein are also illustrative and not limiting. In some embodiments, there can be a single control code with a defined deferral condition (e.g., defer for 24 hours). Other embodiments can provide multiple control codes for multiple deferral conditions, including location-based conditions, activity-based conditions, and so on. A "lexicon" of control codes can be designed and can be made as simple or complex as desired; the design of the lexicon can involve tradeoffs between flexibility (e.g., more codes for more conditions or logical combinations of conditions) and ease of use (e.g., the user's ability to remember the correct code for a desired behavior).

In embodiments described above, control codes can be used to initiate deferral of messages, and deferral is described in terms of removing a message from an inbox until some condition is met, at which point the message is restored to the inbox. (As used herein, an "inbox" can refer to any collection of messages received for a particular user or user account.) In addition, control codes can be used to initiate other operations on a message, such as moving a message to a folder, replying to a message, blocking a sender, generating an alert, or the like.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A computer-implemented method comprising:
   receiving, at a message management system, a message sent to a recipient user;
   detecting a control code within the message, wherein the control code is a text input provided by a sender of the message, wherein the control code is embedded in a recipient address field of the message, the recipient address field including a recipient address with a username portion and a domain name portion, wherein the control code is appended to the username portion of the recipient address, and wherein the control code identifies one or more deferral conditions, the one or more deferral conditions including a location-based condition, wherein the location-based condition includes whether the recipient user's device is in a particular location;
   determining the one or more deferral conditions based on the control code in the recipient address field of the message; and
   deferring the message until at least the location-based condition of the one or more deferral conditions is met, wherein deferring the message includes causing the message to be excluded from an inbox of the recipient user until the one or more deferral conditions are met.

2. The computer-implemented method of claim 1 wherein the message is an email message, an SMS/MMS message, or an instant message.

3. The computer-implemented method of claim 1 wherein the control code is in a message header field of the message.

4. The computer-implemented method of claim 1 wherein the control code is in a recipient address field of the message.

5. The computer-implemented method of claim 1 wherein the control code is in a body field of the message.

6. The computer-implemented method of claim 1 wherein the control code is one of a plurality of known control codes and wherein different ones of the plurality of control codes identify different deferral conditions.

7. The computer-implemented method of claim 1 further comprising:
   determining whether the received message is a forwarded message having a parent message; and
   in the event that the received message is a forwarded message related to a parent message, deferring the parent message based on the control code.

8. A computer-implemented method comprising:
   receiving a message having a recipient address identifying a recipient user;
   detecting a control code within the recipient address or in the body of the message, wherein the control code is a text input provided by a sender of the message, wherein the control code is embedded in a recipient address field of the message, the recipient address field including a recipient address with a username portion and a domain name portion, and wherein the control code is appended to the username portion of the recipient address, and wherein the control code identifies one or more deferral conditions, the one or more deferral conditions including an activity-based condition, wherein the activity-based condition includes whether the recipient user's device is in a particular location;
   determining the one or more deferral conditions based on the control code in the recipient address field of the message; and
   deferring the message until at least the activity based condition of the one or more deferral conditions is met, wherein deferring the message includes causing the message to be excluded from an inbox of the recipient user until the one or more deferral conditions are met.

9. The computer-implemented method of claim 8 wherein the recipient address has a username portion and a domain name portion and wherein the control code is a character string placed within the recipient email address between the username portion and the domain name portion.

10. The computer-implemented method of claim 8 wherein the control code is one of a plurality of known control codes and wherein different ones of the plurality of control codes identify different deferral conditions.

11. The computer-implemented method of claim 8 wherein the deferral condition is a temporal condition.

12. A computer-implemented method comprising:
receiving a first message for a recipient;
receiving a second message for the recipient, the second message including a forwarded version of the first message;
detecting a control code in a field of the second message, wherein the control code is a text input provided by a sender of the message, wherein the control code is embedded in a recipient address field of the message, the recipient address field including a recipient address with a username portion and a domain name portion, wherein the control code is appended to the username portion of the recipient address, and wherein the control code identifies one or more deferral conditions, the one or more deferral conditions including a condition;
determining the one or more deferral conditions based on the control code; and
deferring the first message until the one or more deferral conditions are met, wherein deferring the first message includes causing the first message to be excluded from an inbox of the recipient user until the one or more deferral conditions are met.

13. The computer-implemented method of claim 12 further comprising:
after determining the deferral condition, discarding the second message.

14. The computer-implemented method of claim 12 wherein the control code is detected in a recipient-identifying field of the second message.

15. The computer-implemented method of claim 14 wherein the first and second messages are email messages and wherein the control code is incorporated in a recipient address of the second message.

16. The computer-implemented method of claim 12 wherein the control code is one of a plurality of known control codes and wherein different ones of the plurality of control codes identify different deferral conditions.

17. The computer-implemented method of claim 12 wherein the deferral condition is a temporal condition.

18. A message management system comprising:
a client interface configured to communicate with a client;
a messaging service interface configured to communicate with a messaging service and to receive inbound messages from the messaging service; and
a message management module configured to process the inbound messages, wherein processing the inbound messages includes:
determining whether the inbound message includes a control code indicative of a deferral condition to be applied, wherein the control code is a text input within the body or the recipient address of the inbound message provided by a sender of the message, wherein the control code is embedded in a recipient address field of the message, the recipient address field including a recipient address with a username portion and a domain name portion, wherein the control code is appended to the username portion of the recipient address, and wherein the control code identifies one or more deferral conditions, the one or more deferral conditions including a location-based condition, wherein the location-based;
in the event that the inbound message includes a control code, determining whether the inbound message is a forwarded message having a parent message;
in the event that the inbound message is not a forwarded message, deferring the inbound message based on the control code; and
in the event that the inbound message is a forwarded message, deferring the parent message based on the control code until at least the location-based condition of the one or more deferral conditions is met.

19. The message management system of claim 18 wherein determining whether the inbound message is a forwarded message having a parent message includes determining whether a recipient address of the inbound message and a sender address of the inbound message refer to the same user.

20. The message management system of claim 18 wherein processing the message further includes:
in the event that the inbound message is a forwarded message, discarding the forwarded message.

* * * * *

UNITED STATES PATENT AND TRADEMARK OFFICE
CERTIFICATE OF CORRECTION

PATENT NO. : 10,237,223 B2
APPLICATION NO. : 14/161626
DATED : March 19, 2019
INVENTOR(S) : Anthony Lu Page 1 of 1

It is certified that error appears in the above-identified patent and that said Letters Patent is hereby corrected as shown below:

In the Claims

Column 17, Claim 12, Line 15, please replace "condition;" with --location-based condition, wherein the location-based condition includes whether the recipient user's device is in a particular location;--

Column 18, Claim 18, Line 21, please insert after "based" --condition includes whether the recipient user's device is in a particular location--

Signed and Sealed this
Twenty-sixth Day of November, 2019

Andrei Iancu
*Director of the United States Patent and Trademark Office*